United States Patent

Parker et al.

Patent Number: 6,041,403
Date of Patent: *Mar. 21, 2000

[54] METHOD AND APPARATUS FOR GENERATING A MICROINSTRUCTION RESPONSIVE TO THE SPECIFICATION OF AN OPERAND, IN ADDITION TO A MICROINSTRUCTION BASED ON THE OPCODE, OF A MACROINSTRUCTION

[75] Inventors: Donald D. Parker, Beaverton; Darrell D. Boggs, Aloha; Alan B. Kyker, Portland, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/721,900

[22] Filed: Sep. 27, 1996

[51] Int. Cl.[7] ........................................... G06F 9/28
[52] U.S. Cl. ........................................ 712/210; 712/212
[58] Field of Search .................................... 395/385, 383, 395/384, 386, 388; 712/210, 212

[56] References Cited

U.S. PATENT DOCUMENTS

| Re. 32,493 | 9/1987 | Matsumoto et al. | 395/386 |
|---|---|---|---|
| 4,399,505 | 8/1983 | Druke et al. | 395/596 |
| 4,554,627 | 11/1985 | Holland et al. | 395/571 |
| 4,890,218 | 12/1989 | Bram | 395/386 |
| 5,109,495 | 4/1992 | Fite et al. | 712/207 |
| 5,142,633 | 8/1992 | Murray et al. | 395/566 |
| 5,148,528 | 9/1992 | Fite et al. | 395/386 |
| 5,148,532 | 9/1992 | Narita et al. | 395/595 |
| 5,247,624 | 9/1993 | Koumoto et al. | 395/387 |
| 5,559,974 | 9/1996 | Boggs et al. | 395/393 |
| 5,630,082 | 5/1997 | Yao et al. | 712/213 |
| 5,630,083 | 5/1997 | Carbine et al. | 395/388 |
| 5,673,427 | 9/1997 | Brown et al. | 395/595 |

*Primary Examiner*—Meng-Ai T. An
*Assistant Examiner*—Gautam R. Patel
*Attorney, Agent, or Firm*—Blakely, Sokoloff, Taylor & Zafman LLP

[57] ABSTRACT

A method and apparatus for decoding a macroinstruction, the macroinstruction including an operational code (opcode) and a specification of an operand, is described. The method includes two primary steps, which are performed either serially or in parallel. When performed serially, the steps may be performed in any order. The first primary step involves the generation of a first micro-instruction, specifying a first micro-operation, the first micro-instruction being derived from the specification of the operand of the macroinstruction. The second primary step involves the generation of a second micro-instruction, specifying a second micro-operation, the second micro-instruction being derived from the opcode of macroinstruction. The specification of the operand may specify the operand to be either a memory operand or a register operand in a manner that necessitates data processing or manipulation prior to a memory access or to execution of the second micro-instruction. More specifically, the specification of the operand in the macroinstruction may require alignment of operands retrieved from registers, prior to execution of the second instruction. In this case, the first micro-instruction may require a shift operation after retrieval of the operands.

34 Claims, 8 Drawing Sheets ial code (opcode) and a specification of an operand. The

METHOD AND APPARATUS FOR GENERATING A MICROINSTRUCTION RESPONSIVE TO THE SPECIFICATION OF AN OPERAND, IN ADDITION TO A MICROINSTRUCTION BASED ON THE OPCODE, OF A MACROINSTRUCTION

FIELD OF THE INVENTION

The present invention pertains to the field of computer systems. More particularly, the present invention relates to a decoder arrangement for decoding macroinstructions into micro-instructions within a microprocessor.

BACKGROUND OF THE INVENTION

Computers perform operations under the direction of a linear sequence of instructions, which may be supplied in the form of a computer program. Computer programs are commonly written in a high-level language, such as FORTRAN or "C". The instructions of the high-level computer program are then compiled into lower-level instructions, commonly know as macroinstructions, having a format which can be decoded. Alternatively, a computer program may be written directly as a series of macroinstructions. The Intel Architecture Instruction Set provides an example of a body of macroinstructions, and includes operation codes (opcodes) such as ADD, MOVE, PUSH and many more.

During execution of a computer program, macroinstructions are fetched from memory, and supplied to a decoder within a microprocessor, which decodes the macroinstructions into corresponding micro-instructions. A single macroinstruction may spawn a single micro-instruction, or a series of micro-instructions, depending on the number of execution unit and memory operations required by the operation code (opcode) of the macroinstruction. The micro-instructions are then issued to the various execution units within the microprocessor for execution.

While micro-instructions provide a low-level specification of operations to be performed by execution units, the specification of operands (also termed "operand specifiers") within some micro-instruction may require that additional operations be performed within execution units, so as to allow the micro-instruction to be executed. For example, the micro-instruction AH:=add (AH, BL) requires, prior to the actual adding operation, that the value in either the AH register or the BL register be shifted into alignment with the value in the other register. Register structures employed by Intel Architecture processors are described in the *Pentium™ Processor User's Manual, Volume 3: Architecture and Programming Manual*, 1994, Section 3.3.1, pages 3-8 to 3-10, which is available from Intel Corporation. In prior art microprocessors, a misalignment was detected and a shifting operation performed by shifting circuitry associated with, or incorporated within, an arithmetic logic unit (ALU) prior to performing the actual adding operation. Prior art microprocessors subjected all micro-instructions requiring an addition operation to scrutiny by this shifting circuitry.

At certain clock frequencies, an ALU may be able to perform an additional operation required by the specification of an operand within a micro-instruction, such as the shifting operation described above, together with the addition operation (ADD) in a single clock cycle, and without any performance penalties. However, as the frequency at which functional units operate is increased, it is desirable to simplify functional units, such as the ALU, so as to increase the overall performance of the processor. To achieve this simplification, it is desirable to limit the number of operations that any single functional unit performs, and to increase the granularity of these functional units.

SUMMARY OF THE INVENTION

In its broadest application, the present invention proposes generating micro-instructions (also termed micro-operations or "uops") having a higher granularity than prior art micro-instructions, and macroinstruction decoding circuitry for generating these micro-instructions of a higher granularity. This is achieved by injecting additional micro-instructions into the micro-instructions flow, the additional micro-instructions instructing operations that may have been performed "invisibly" within prior art functional units. The macroinstruction decoding methods and circuitry proposed by the present invention are particularly advantageous in that they allow redundant operations performed within certain functional units of prior art microprocessors to be eliminated, and they facilitate the construction of simplified functional units, which can operate at higher frequencies.

According to a first aspect of the invention there is provided a method of decoding a macroinstruction, the macroinstruction including an operational code (opcode) and a specification of an operand. The method includes two primary steps, which are performed either serially or in parallel. When performed serially, the steps may be performed in any order. The first primary step involves the generation of a first micro-instruction, specifying a first micro-operation, the first micro-instruction being derived from the specification of the operand of the macroinstruction. The second primary step involves the generation of a second micro-instruction, specifying a second micro-operation, the second micro-instruction being derived from the opcode of the macroinstruction.

The specification of the operand may, for example, specify the operand to be either a memory operand or a register operand in a manner that necessitates data processing or manipulation prior to a memory access or to execution of the second micro-instruction. More specifically, the specification of the operand in the macroinstruction may require alignment of operands retrieved from registers prior to execution of the second instruction. In this case, the first micro-instruction may require a shift operation after retrieval of the operands. The specification of the operand may also, for example, require the generation of a linear address, prior to a memory access. At least one of the operations involved in the generation of a linear address is then instructed in the first micro-instruction, so that this operation is then performed in an arithmetic logic unit (ALU), as opposed to an address generation unit (AGU).

According to a second aspect of the invention there is provided a decoder arrangement for decoding a macroinstruction, the macroinstruction including an operational code (opcode) and a specification of an operand. The decoder arrangement includes an "operand" decoder configured to generate a first micro-instruction, specifying a first micro-operation, the first micro-instruction being derived from the specification of the operand of the macroinstruction. Also included in the decoder arrangement is an "opcode" decoder configured to generate a second micro-instruction, specifying a second micro-operation, the second micro-instruction being derived from the opcode of the macroinstruction. Logic circuitry, for determining whether the specification of the operand in the macroinstruction necessitates data manipulation prior to execution of the second micro-operation (as described above), is also included in the decoder arrangement. The logic circuitry examines the specification of the operand, and prevents the decoder arrangement from issuing the first micro-instruction if it is determined that the specification of the operand within the macroinstruction does not necessitate data manipulation. The logic circuitry also ascertains whether the opcode is of a type which may be paired with the specification of an operand which requires data manipulation.

The invention extends to a microprocessor having a memory and an execution unit, and incorporating the decoder arrangement described above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
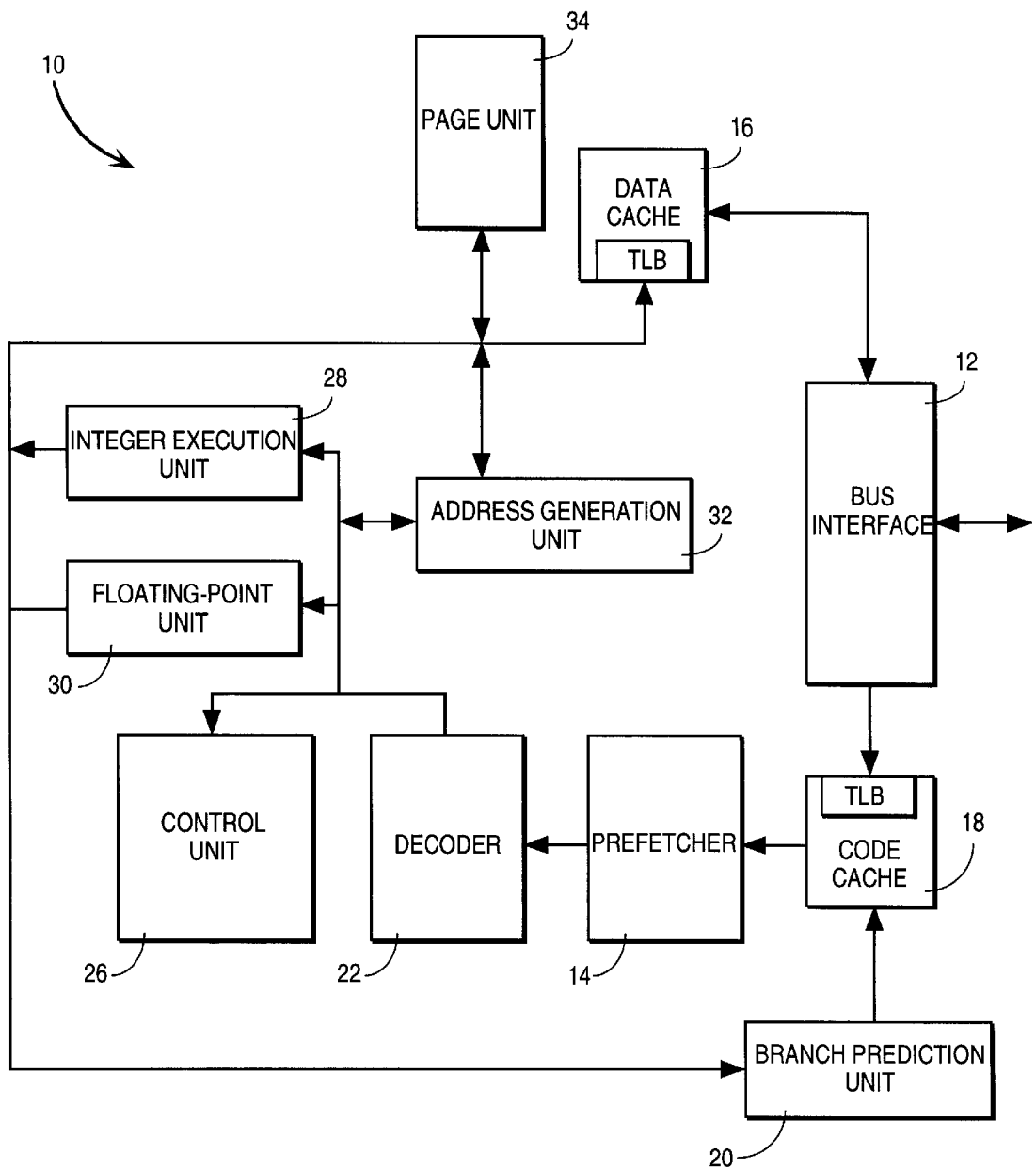
FIG. 1 is a block diagram of a microprocessor within which the present invention can be implemented.

A method and apparatus for decoding a macroinstruction, having an operation code (herein after referred to as an "opcode") and a specification of an operand, are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Macroinstruction Format

This invention relates to the decoding of a macroinstruction into at least one, and in some cases a series of, micro-instructions (also termed "microcode"). In a preferred implementation, the macroinstructions supplied to a decoder, as described below, have the well-known format of the Intel Architecture Instruction Set, which is described in the *Pentium™ Processor User's Manual, Volume* 3: *Architecture and Programming Manual,* 1996, Chapter 3, Sections 3.4 and 3.5, pages 3-15 to 3-22, available from Intel Corporation. In the specified format, a macroinstruction can be up to fifteen bytes in length. At least one byte is an operation code (opcode) byte, which specifies the operation to be performed by the macroinstruction. Further parts of the macroinstruction may include prefix bytes, immediate operand bytes, a register specification, an addressing-mode specification, an SIB (scale, index, base) byte and a displacement value. Prefix bytes specify information relating to the address and operand size and other control information. Immediate operand bytes comprise data on which the operation specified in the opcode must operate, and a macroinstruction may include zero (for example in a NOP macroinstruction) or up to four immediate operand bytes.

An operand, specified in the macroinstruction by the operand specifier, can be positioned in a number of locations, including:

(a) In the macroinstruction, in which case the operand is termed an IMMEDIATE operand. An example of an immediate operand is provide in the following macroinstruction:

*IMUL CX, MEMWORD, 3* which requires a word in memory to be multiplied by the immediate operand 3,and then stored in the register CX.

(b) In a register, in which case the operand is termed a REGISTER operand. A register operand is specified by a register address such as EAX (32-bit operand), AX (16-bit operand) or AH (8-bit operand). Examples of register operands are provide in the following macroinstruction:

*ADD AX,BX* where both AX and BX are register operands.

(c) In memory, in which case the operand is termed a MEMORY operand. Macroinstructions may include a modR/M byte which is located after the opcode byte, and specifies whether the operand is in memory or in a register. A memory operand is specified by the segment containing the operand and the offset from the beginning of the segment to the operand. Segments may be specified in a segment over-ride prefix byte, which is located at the beginning of a macroinstruction. In the absence of a segment over-ride prefix byte, a default segment is assigned. The offset (also termed the "effective address") within the segment may be specified by a number of variables, including a base value, an index value, a scaling factor and a displacement. Varying combinations and permutations of the variables may be present in the specification of an operand within a macroinstruction. An example of a memory operand is provide in the following macroinstruction:

*MOV BH, SS:[BP+SI+DISP]* where the phrase SS:[BP+SI+DISP] specifies a memory operand.

Where two registers are identified within the specification of a memory operand, this form of specification is referred to as 2-register addressing. Similarly, where only one register is identified within the specification of a memory operand, this form of specification is referred to as 1-register addressing.

(d) At an input/output (I/O) port.

Microprocessor Overview

Referring firstly to FIG. 1, a block diagram of a microprocessor 10 within which the present invention can be incorporated and practiced is shown. The microprocessor 10 comprises a bus interface 12, which provides the interface between the microprocessor 10 and a bus (not shown) of a computer system. The bus interface 12 is coupled to allow a pre-fetcher 14 and a data cache 16 to access the main memory (not shown) of the computer system. Coupled between the bus interface 12 and the pre-fetcher 14 is a code cache 18, which is accessible by a branch prediction unit (BPU) 20. The microprocessor 10 further comprises an instruction decoder 22 coupled to the pre-fetcher 14, for decoding instructions fetched by the pre-fetcher 14. The control unit 26 receives micro-instructions directly from the instruction decoder 22, as will be described in more detail below. The control unit 26 sequences and distributes the micro-instruction to execution units within the microprocessor 10. The control unit 26 facilitates out-of-order execution, and includes register renaming logic, a reservation station, a re-order buffer and retirement logic. The control unit 26 supplies various execution units, including an integer pipeline execution unit (IEU) 28, a floating-point pipeline execution unit (FEU) 30, and an address generation unit (AGU) 32 with micro-instructions for execution. The various execution units 28–32 are coupled to have access to the data cache 16. A page unit 34 is also coupled to facilitate the translation of linear addresses to physical addresses when paging is enabled. The AGU 32 and the page unit 34 comprises part of a memory management unit (MMU) of the microprocessor 10.

Decoder Unit Overview

Figure 2:
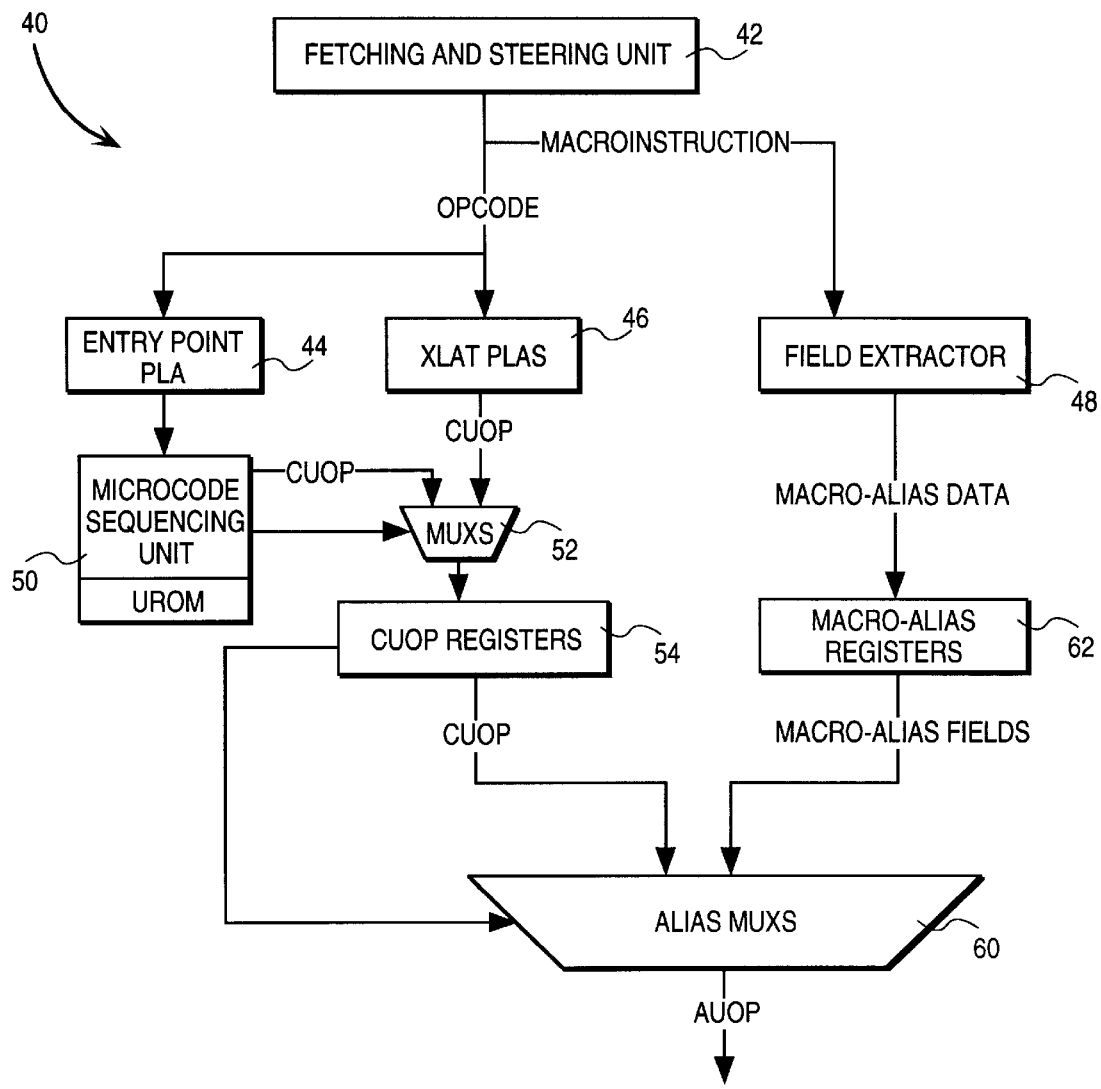
FIG. 2 is a block diagram of an aliased decoder within which the present invention can be employed.

Turning to FIG. 2, a more detailed block diagram of a decoder unit 40, incorporating the decoder 22 of FIG. 1, is shown. In one embodiment, the decoder unit 40 described herein is designed to decode macroinstructions incorporating the Intel Architecture Instruction Set, which includes instructions executable by microprocessors manufactured by Intel Corporation including the 8086, 8087, i386 ™, 80287, i486™ and Pentium™ and Pentium Pro™ microprocessors. The structures described herein could however be used to decode macroinstructions incorporating opcodes other than those of the Intel Architecture Instruction Set. The decoder unit 40 is a so-called "full" decoder (as opposed to a "partial" decoder) as it incorporates an entry-point PLA and an associated microcode sequencing unit, and is accordingly able to decode all macroinstructions. In contrast, a partial decoder is only able to decode a subset of micro-instruction, incorporating predetermined opcodes. However, it will be understood that the following description is equally applicable to a "partial" decoder, not incorporating the entry-point PLA.

The decoder unit 40 includes an aliasing system, in which the opcode of a macroinstruction is decoded into control micro-operations ("Cuops"), and fields from the macroinstruction are extracted and stored in alias registers. The aliasing system provides a mechanism by which the fields extracted from the macroinstruction can be indirectly referenced and incorporated into micro-instructions which issue from the decoder unit 40. A detailed description of an aliasing system is provided in U.S. Pat. No. 5,222,244, issued to Carbine et al., on Jun. 22, 1993. The depiction of the decoder unit 40 in FIG. 2 furthermore only depicts those elements and structures of the decoder unit 40 necessary for an understanding of one embodiment of the present invention.

Fetching and steering circuitry 42 simultaneously presents a macroinstruction, having the format described above, to an entry-point programmable logic array (PLA) 44, a bank of XLAT PLAs 46, and a field extractor 48. The term XLAT PLA refers to a "translate programmable logic array". The bank of XLAT PLAs 46 may comprise any number of XLAT PLAs operating in parallel. As shown, the entry-point PLA 44 and the XLAT PLAs 46 primarily reference the opcode byte(s) of the macroinstruction to generate control micro-operations ("Cuops"), including control fields and a template. The PLAs 44 and 46 may also reference prefix bytes, such as a repeat prefix byte and an operand size prefix byte.

The entry-point PLA 44, in conjunction with a microcode sequencing (MS) unit 50, functions to decode macroinstructions which are complex, and require the generation of more Cuops that can be supplied from the XLAT PLAs 46. More specifically, the entry-point PLA 44 references the opcode of a micro-instruction to generate a microcode ROM address (also referred to as an entry-point address), which is supplied to the microcode ROM (UROM) of the MS unit 50. The entry-point address points to a starting address in the UROM, where Cuops corresponding to the reference opcode are stored. The MS unit 50, under the direction of assist handling protocols, then supplies a series of Cuops to a multiplexer (MUX) 52. On the other hand, for frequently-used macroinstructions which require the generation of less Cuops (for example, between one and four Cuops), these Cuops are provided in parallel from the XLAT PLAs 46. The XLAT PLAs 46 provide a performance advantage in respect of Cuops issued therefrom, as opposed to Cuops issued from the MS unit 50. Each of the PLAs 46 have a number of entries (also referred to as "minterms") which reference a plurality of opcodes to corresponding Cuops. The aliasing system is particularly advantageous as it allows the number of minterms in the PLAs 46 to be reduced substantially.

The Cuops issued by the MS unit 50 and the XLAT PLAs 50 are transmitted to the Cuop MUX 52, which comprises a plurality of 2:1 multiplexers which each select between a Cuop supplied from an XLAT PLA 46 and a Cuop supplied from the MS unit 50. Control for the MUX 52 is supplied from the MS unit 50, so as to allow the MS unit 50 to insert Cuops into the Cuop flow from the MUX 52 to Cuop registers 54.

Figure 3:
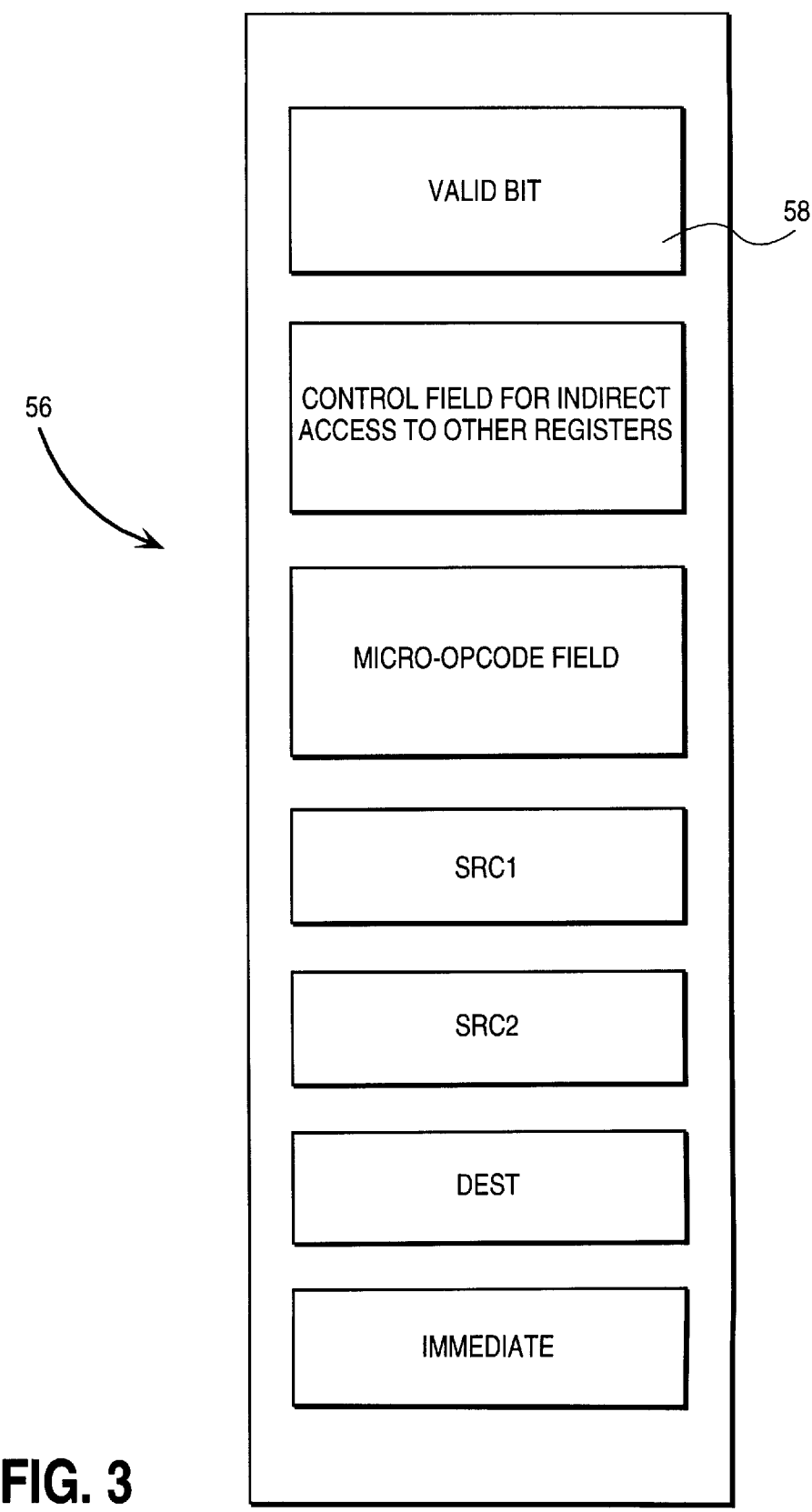
FIG. 3 is a diagrammatic representation of a control micro-operation (Cuop) generated within the aliased decoder of FIG. 2.

Referring briefly to FIG. 3, the fields defined in a Cuop 56 issued from the MS unit 50 or the XLAT PLAs 46, and stored in the Cuop register 54, are shown. Most significantly, each Cuop 56 includes a valid bit 58, which is a 1-bit field and indicates whether the Cuop 56 is valid. A Cuop 56 including a valid bit 58 which shows the Cuop 56 to be invalid will not issue from the Cuop register 54. The valid bit 58 is particularly useful in a decoder including multiple XLAT PLAs 46, as it allows the Cuop register 54 to determine which received Cuops are valid, and should be issued to alias multiplexers 60.

Turning again to FIG. 2, the opcode, immediate operand, address and control bytes of the macroinstruction are referenced by the field extractor 48. The field extractor 48 includes circuits to extract aliasable fields, such as fields specifying memory operands ( e.g. the SIB and Displacement bytes), register operands ( e.g. the Register Specifier)

and other control bytes (e.g. Addressing-mode specifier), from the macro-instruction, and presents these fields to a macro-alias register 62. The field extractor 48 also references prefix bytes of the macroinstruction to determine the size of specified operands (i.e. 16- or 32-bit). The field extractor 48 stores the macro-alias data, which is then provided to the alias multiplexers 60, for selective combination with valid Cuops in order to assemble complete aliased micro-operations ("Auops"). Auops are issued from the alias multiplexers 60 to other functional units, such as the control unit 26 and the execution units 30–32, for scheduling and eventual execution.

A micro-instruction (or Auop) issued from the decoder unit 40 may incorporate bits specifying an operand, in a manner which necessitates processing or manipulation prior to a memory access required by the micro-instruction, or prior to execution of the micro-instruction itself. Non-limiting examples of micro-instruction types requiring such operand processing or manipulation include:

(1) micro-instructions, requiring an 8-bit register operation and specifying misaligned register operands. For example the micro-instruction:

*AH:*=add (*AH, BL*)

requires that shifting circuitry with the integer execution unit 28 shift an operand obtained from the AH register to a low-eight bit (or low byte) location, or shift an operand obtained from the BL register to a high-eight bit (or high byte) location, prior to presenting the operands to an arithmetic logic unit (ALU) within the integer execution unit 28. In prior art microprocessors, the shifting circuitry within the integer execution unit 28 detects misaligned register operands, and performs the above described shifting operation when required. The shifting operation is performed within one clock cycle together with the ALU operation, such as an add operation. Consequently, there is no performance penalty resulting from this shifting operation. However, as the operating frequency of execution units, including integer execution units, increases, the shifting operation can no longer be accommodated within a single clock cycle window together with the add operation. It is also desirable to simplify the execution units of the processor to enable a higher operating frequency. Accordingly, it has become undesirable to perform this shifting operation for micro-instructions within the integer execution unit 28 of the ALU.

(2) micro-instructions incorporating an operand specification utilizing 2-register addressing. For example a micro-instruction:

*BH:*=load *SS:[BP+SI+DISP]* may require the addition of the values located in the BP and SI registers. In prior art microprocessors, this addition of the values stored in the BP and SI registers was performed within the AGU 32 for all micro-instructions having memory operands, regardless of whether this addition was actually required or not for address generation For example, the SI register may not be named in the operand specification, or may contain a zero value, in which case the above described addition operation is unnecessary. Again, at the speeds at which prior art AGUs operate, it is possible to absorb this often redundant step within clock cycles required for "always necessary" operations, without any performance penalty. However, at increased operating frequencies, it is difficult to absorb this often unnecessary addition operation within clock cycles required for the "always necessary" operations, and it has become undesirable to perform this addition operation where the memory operand specification does not require the operation.

(3) micro-instructions incorporating an operand specification having a scaled index. For example the micro-instruction

*EAX:*=load.*SS:[EBX,+ESI*8]* requires the multiplication of the value located in the ESI register by 8, this multiplication being achieved by a shifting operation on the contents of the ESI register. In prior art microprocessors, this shifting operation is typically performed in the AGU, which becomes undesirable at high operating frequencies. The comments given above apply to this example.

The present invention seeks to address the problems discussed above by identifying macroinstructions incorporating operand specifications which require some measure of data manipulation or processing prior to a memory access or to execution of the micro-instructions spawned by the macroinstruction. These identified macroinstructions are decoded to provide an independent micro-instruction for performing the data manipulation or processing required by the specification of the operand. This independent micro-instruction removes the necessity of performing often unnecessary "blind" data operations within the execution units (such as the adding of BP and SI values within the AGU as described above) and also allows certain operations, which in the prior art were performed "invisibly" by certain function units, to be allocated to other function units when the need for these operations arises. The removal of the burden of performing unnecessary "blind" operations and of detecting and performing supplementary operations (such as data alignment) within execution units allows for the design of simpler, and consequently faster, execution units.

A number of methods and decoder arrangements for implementing the present invention are discussed below. Examples of the outputs of the methods and decoder arrangements are firstly contrasted with the outputs of prior art decoders so as to provide a clearer understanding of the present invention:

EXAMPLE 1

Operand Specification Type 8-bit register operation specifying misaligned register operands:

| Macroinstructions: | Micro-instruction generated by prior art |
|---|---|
| ADD AH, BL | decoder: |
| | AH:=add (AH, BL) |
| | Micro-instruction generated by present invention: |
| | TMP:=shift.low8_high8 (EBX) |
| | EAX:=add (EAX, TMP) |

As is apparent from the above example, the present invention generates an independent micro-instruction to align the register operands, thus removing the burden of detecting and performing this shift operation from circuitry associated with the ALU in which the addition operation is performed.

EXAMPLE 2
Operand Specification Type
  2-register addressing:

| Macroinstructions:<br>MOV BX, SS:[BP + SI + DISP] | Micro-instruction generated by prior art decoder:<br>BX:=load SS: [BP + SI + DISP]<br>Micro-instruction generated by present invention:<br>TMPX:=add (BP, SI)<br>BX:=load (TMPX, SS_DISP) |
|---|---|

In example 2, the present invention generates an independent micro-instruction to perform the addition of values stored in the BP and SI registers only when necessary, thus removing this function from circuitry within an AGU, and assigning the operation to an ALU. Accordingly, the AGU does not unnecessarily perform this function, and the circuitry of prior art AGUs required to perform the function can be omitted.

EXAMPLE 3
Operand Specification Type
  Scaled-index:

| Macroinstructions:<br>MOV EAX, DS [ESI * 8]] | Micro-instruction generated by prior art decoder:<br>EAX:=load (DS:ESI * 80)<br>Micro-instruction generated by present invention:<br>TMP:=shift (ESI, 8)<br>EAX:=load (TMP, DS) |
|---|---|

In example 3, the present invention generates an independent micro-instruction to perform the shifting of the contents of the ESI register, thus removing the burden of performing this function from the AGU, allowing for a simplified AGU architecture.

Any one or more of the above described operand specification types may be present in a single macroinstruction, and the above simple macroinstruction examples have been provided so as not to cloud understanding of the invention. However, it will be appreciated that where a plurality of the above operand specification types appear in a single macroinstruction, the present invention will result is a substantial increase in the number of micro-instructions issued from a decoder unit, when compared to prior art decoder units. It will further be appreciated that the micro-instructions of the present invention cited above are of a finer granularity than those generated by prior art decoder units.

Two broad methods and apparatus for realizing the present invention are discussed below. Essentially, a first method and apparatus require the generation of micro-instructions (or at least Cuops) derived from both the opcode and operand specification in parallel, and the subsequent discarding of micro-instructions (or Cuops) derived from the specification of an operand, if not required. This is broadly referred to as the COMPRESSION implementation. A second method and apparatus propose the generation of an intermediate form of micro-instruction, derived from the opcode of a macro-instruction, and the subsequent further decoding of this intermediate form of micro-instruction, if required by the operand specification thereof, into a final form of micro-instruction. This is broadly referred to as the EXPANSION implementation.

Figure 4:
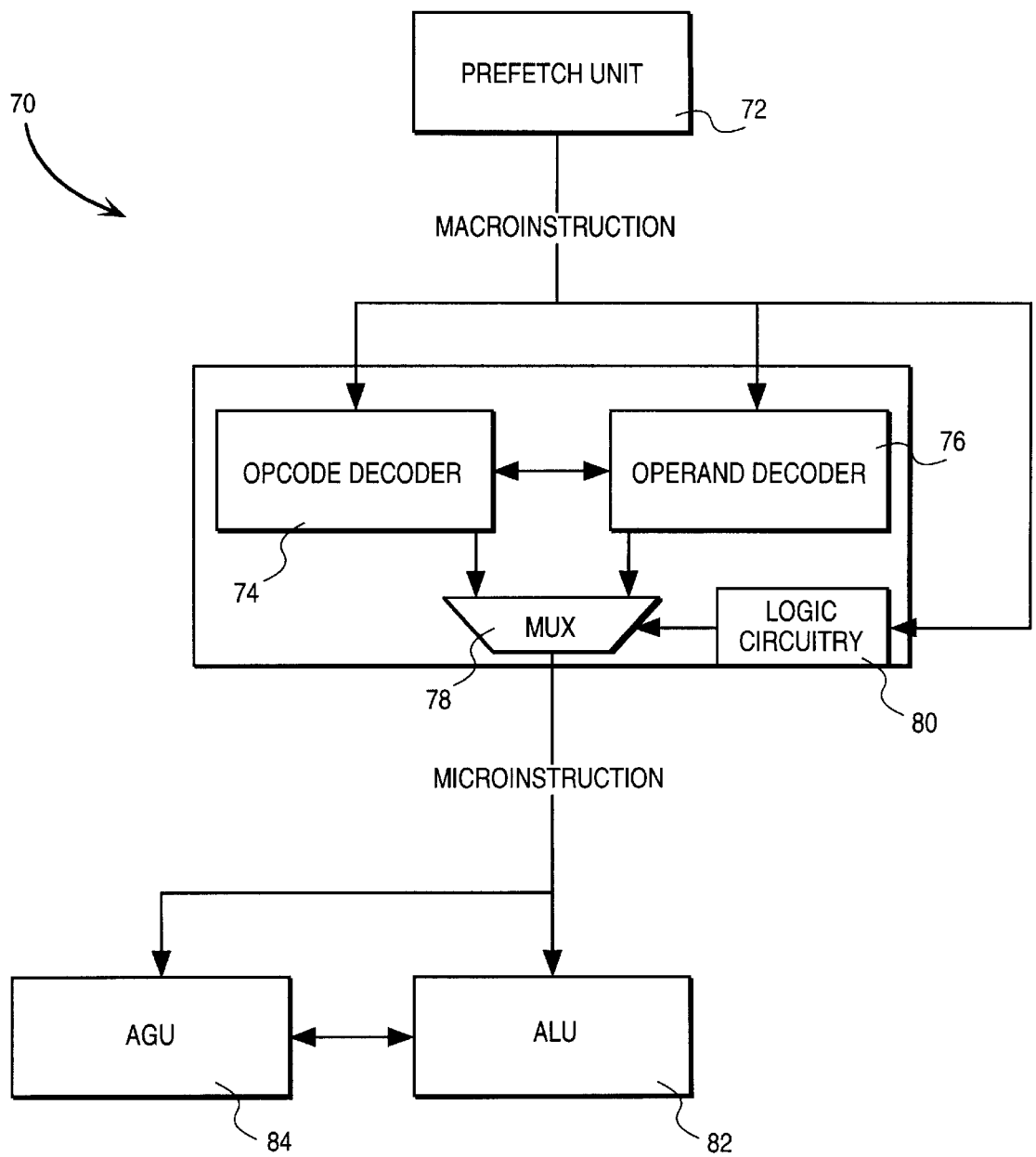
FIG. 4 is a block diagram of a first embodiment of a decoder arrangement for decoding a macroinstruction, and for generating a micro-instruction derived from the specification of an operand in the macroinstruction, according to the present invention.

FIG. 4 shows a block diagram of first embodiment a decoder arrangement 70 for decoding a macroinstruction into a plurality of micro-instructions according to the compression implementation of the invention. The decoder arrangement 70 derives micro-instructions from the opcode and, when necessary, from the specification of the operand (also termed the operand specifier). More specifically, the decoder arrangement 70 receives a macroinstruction for a prefetch unit 72. The decoder arrangement 70 incorporates at least two decoders, namely an opcode decoder 74 and an operand decoder 76. The opcode decoder 74 may comprise a number of decoder units substantially identical to the decoder unit 40 described above with reference to FIG. 2. The identifying characteristic of the opcode decoder 74 is that Cuops are generated, as described above, by a XLAT PLA, by relating opcodes of macroinstructions to a sequence of Cuops, which are used in the assembly of eventual micro-instructions. Accordingly, the number of micro-instructions generated by the opcode decoder 74 is determined by the opcode. The operand decoder 76, on the other hand, relates the specification of an operand (or operands) within the macro-instruction to a further sequence of additional Cuops. The operand decoder 76 incorporates a "look-up" table, which may be implemented in the form of an operand PLA as described below, which correlates the specification of an operand to a sequence of Cuops.

Both the opcode decoder 74 and the operand decoder 76 are coupled to present micro-instructions issued therefrom to a 2:1 multiplexer (MUX) 78. The multiplexer 78 is coupled to receive a SELECT# signal from logic circuitry 80, the logic circuitry 80 operating the MUX 78 to insert micro-instructions issued from the opcode decoder 74 and operand decoder 76 into the flow of micro-instructions from the decoder arrangement 70 to execution units, such as an ALU 82 and an AGU 84. The logic circuitry 80 is shown in FIG. 4 to be located externally of the operand decoder 76. It will however be appreciated the logic circuitry 80 could be incorporated within the operand decoder 76, or even located externally of the decoder arrangement 70.

The logic circuitry 80 is coupled to receive a macroinstruction presented to the decoder arrangement 70, and is programmed or hard-wired to examine portions of the macroinstruction to determine:

(1) whether the macroinstruction should be presented to the operand decoder 76 for decoding. This determination is made by examining the opcode of the macroinstruction to determine whether the macroinstruction is of a type which may be paired with an operand specification requiring a data manipulation or processing. For example, a macroinstruction incorporating the opcode NOP would not require presentation to the operand decoder; and/or (2) whether a micro-instruction issued from the operand decoder 76 should be incorporated in the micro-instruction flow from the decoder arrangement 70, or discarded. For example, the logic circuitry 80 may examine the addressing-mode specifier, the register specifier and/or the SIB (scale, index, base) byte of the macroinstruction to determine whether a micro-instruction, or sequence of micro-instructions, issued from the operand decoder 76 are valid and executable. If the logic circuitry 80 determines that the specification of the operand does not require processing or manipulation, the micro-instructions issued from the operand decoder would be invalidated, and not inserted into the micro-instruction flow from the decoder arrangement 70.

Figure 5:
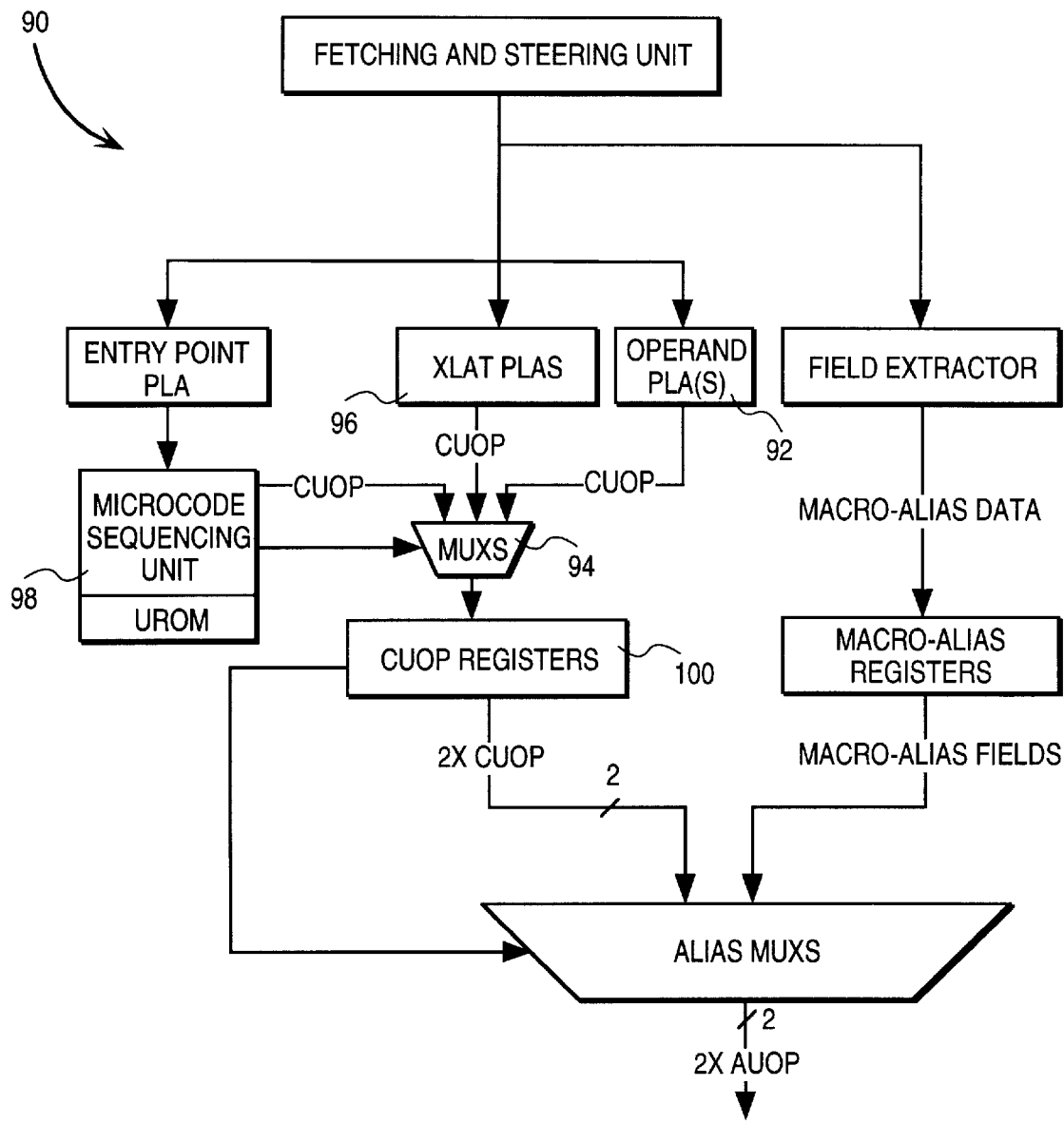
FIG. 5 is a more detailed block diagram representing a variation of the first embodiment of the present invention as shown in FIG. 4.

FIG. 5 illustrates a decoder unit 90 for performing a variation of the compression implementation of the present invention. The decoder unit 90 has substantially the same structure as the decoder unit 40 described with reference to FIG. 2. The decoder unit 90 however incorporates an operand PLA 92 for supplying operand-derived Cuops to a multiplexer 94, which selects between Cuops received from XLAT PLAs 96, a MS unit 98 and the operand PLA 92 for output to a Cuop register 100. The multiplexer 94 is operable by a control signal to select between the inputs from the MS unit 98. The operand PLA 92 may also have associated logic circuitry (not shown) for setting the valid bit 58 of a Cuop issued therefrom, to mark the issued Cuop as being either valid or invalid, as described above with reference to FIG. 3. The valid bit 58 is set to 1 when the associated logic circuitry determines that the specification of the operand requires a data manipulation or processing operation. Otherwise, the associated logic circuitry sets the valid bit 58 to 0, in which case the Cuop will not be issued from the Cuop register 100.

Figure 6:
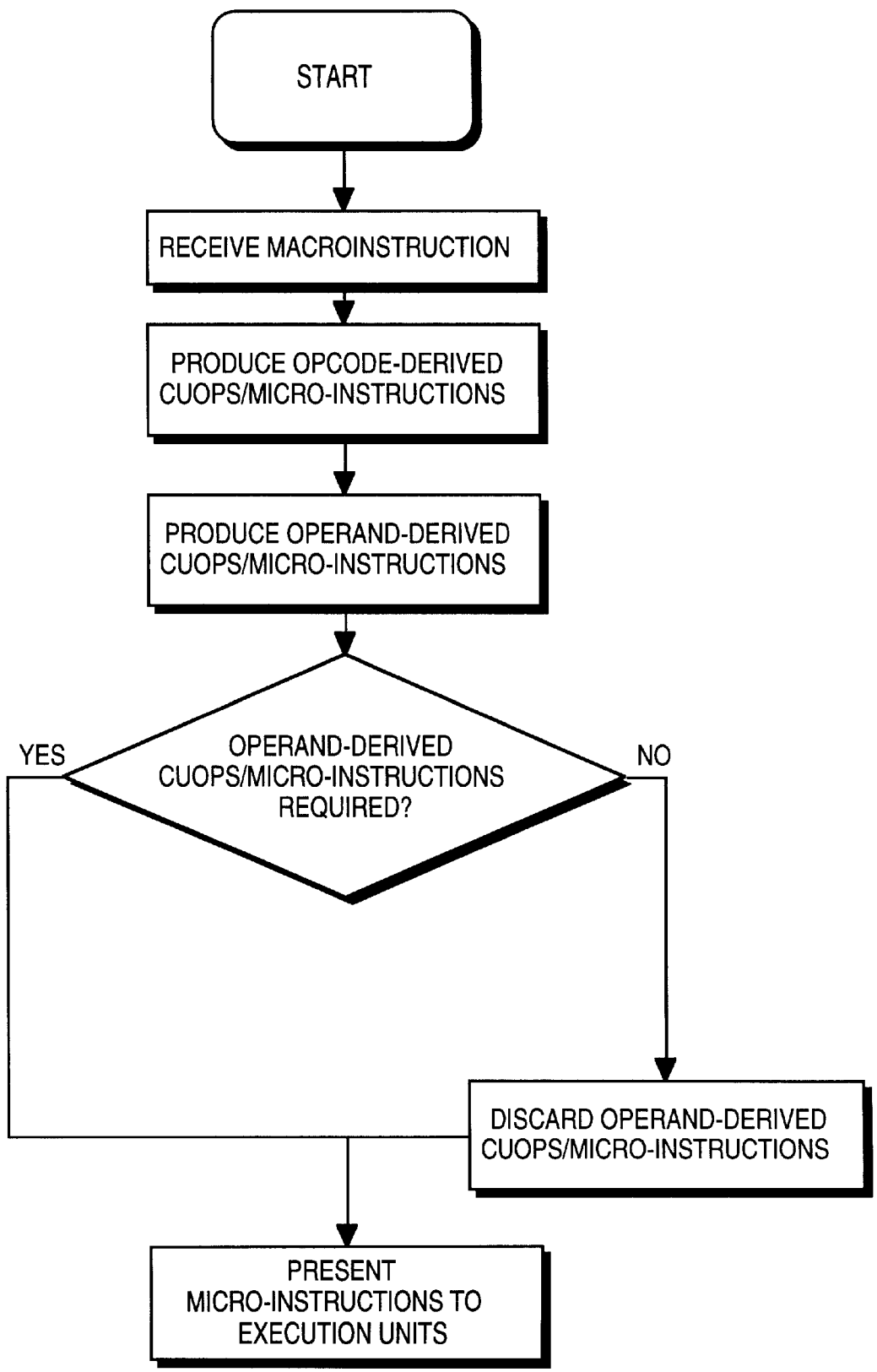
FIG. 6 is a flow chart illustrating a first method of decoding a macroinstruction, and of generating a micro-instruction derived from the specification of an operand, according to the invention.

FIG. 6 is a flow chart illustrating the broad steps included in the compression implementation of the present invention.

Figure 7:
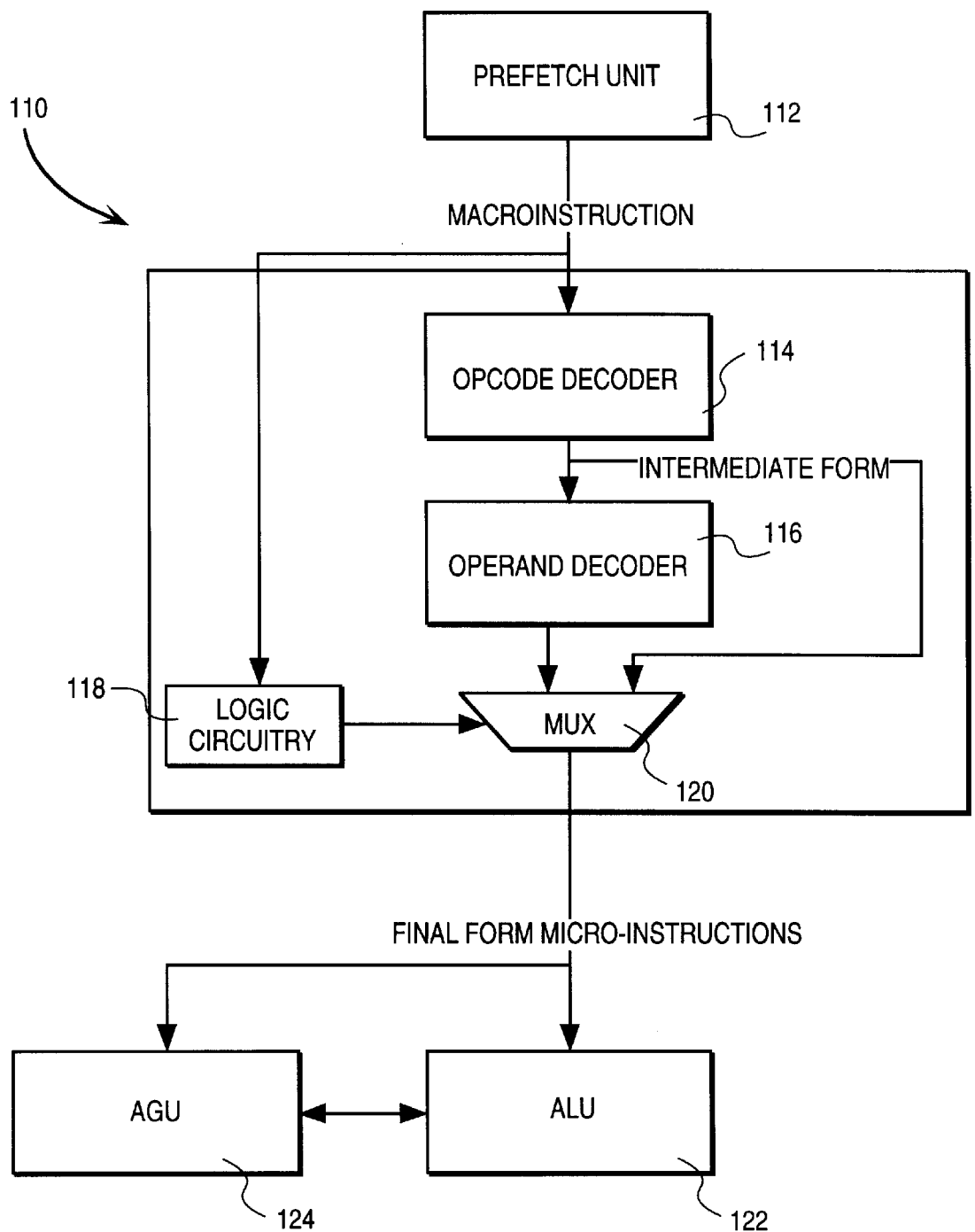
FIG. 7 is a block diagram of a second embodiment of a decoder arrangement for decoding a macroinstruction according to the present invention.

FIG. 7 shows a block diagram of a second embodiment of a decoder arrangement 110 for decoding a macroinstruction into a plurality of micro-instructions according to the expansion implementation of the present invention. The decoder arrangement 110 is coupled to receive macroinstructions from a prefetcher unit 112. As with the embodiment described above with reference to FIG. 4, the decoder arrangement 110 includes at least two decoders, namely an opcode decoder 114 and an operand decoder 116. However, as opposed to the structure in the decoder arrangement 110, where the opcode decoder 74 and the operand decoder 76 are arranged in parallel, the decoders 114 and 116 are arranged in series. The macroinstruction is firstly presented to the opcode decoder 114, which is substantially similar to the decoder described above with reference to FIG. 2, and which decodes the macroinstruction into a micro-instruction, or a sequence of micro-instructions, termed "intermediate form" micro-instructions. These micro-instructions typically have a form and granularity similar to those issued from the prior art decoder unit 40. The decoder arrangement 110 includes logic circuitry 118 for determining whether the macroinstruction incorporates an operand specification which dictates data manipulation or processing. While the logic circuitry 118 is shown in FIG. 7 to be coupled to receive the macroinstruction, it will be appreciated that the logic circuitry 118 could also be coupled to receive the "intermediate form" micro-instruction(s). The logic circuitry 118 provides a control input to a 2:1 multiplexer 120, which is coupled to receive the "intermediate form" micro-instruction(s) from the opcode decoder 114 and "final form" micro-instructions from the operand decoder 116. The determination by the logic circuitry 118 is a two step operation, as described above with reference to logic circuitry 80, and involves firstly determining whether the opcode is the type of opcode that may be paired with operand specification requiring a data processing step. If so, the logic circuitry 118 examines other portions of the macroinstructions to determine the nature of the operand specification. If the logic circuitry 118 determines that the operand specification does not necessitate a data processing step, the "intermediate form" micro-instruction by-passes the operand decoder 116, and then becomes a "final form" micro-instruction, and is selected for transmission to executions units, such as an ALU 122 and an AGU 124. Alternatively, should the logic circuitry 118 determine that the operand specification does necessitate a data processing operation, then the micro-instructions which issue from the operand decoder 116 are selected as being the "final form" micro-instructions.

Figure 8:
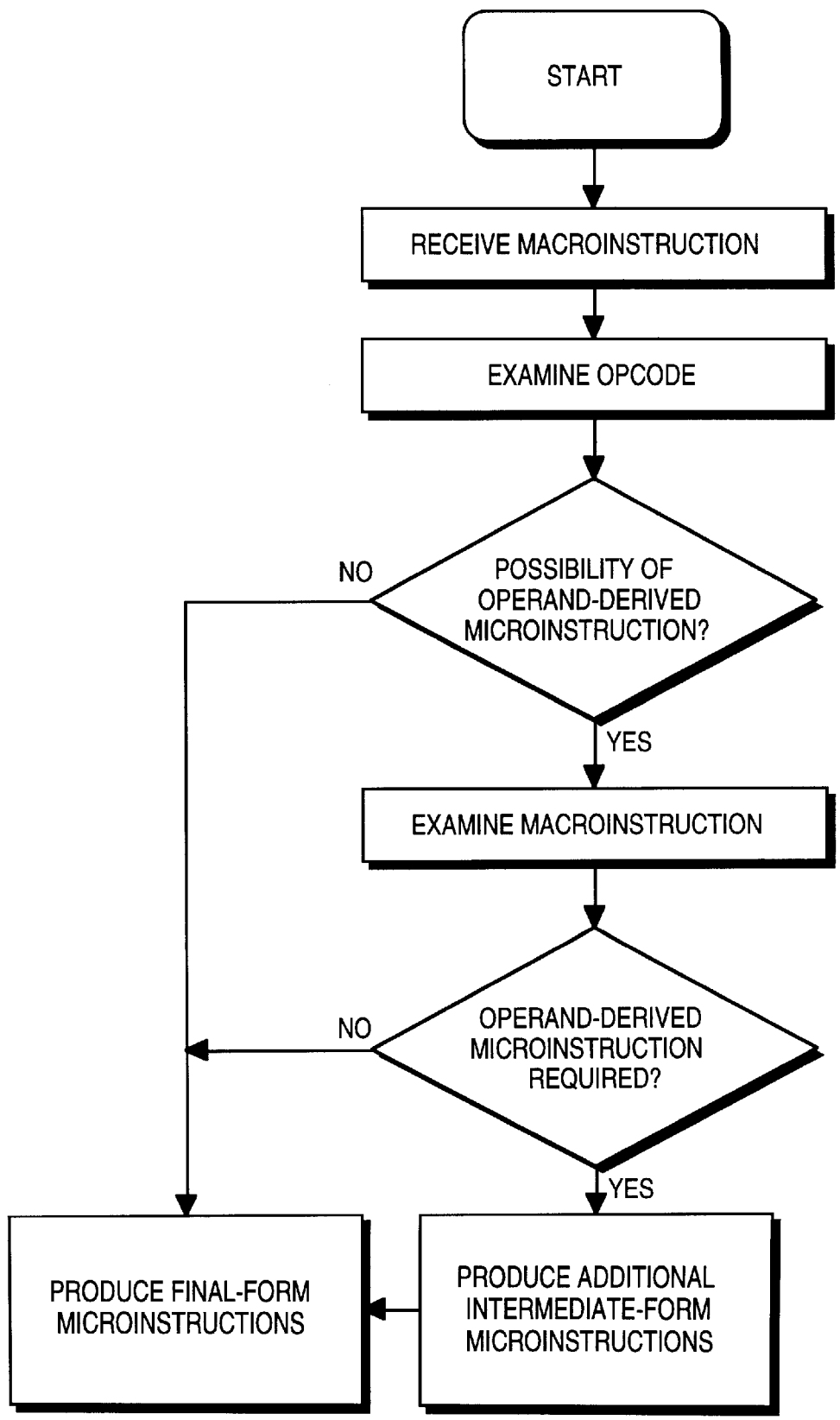
FIG. 8 is a flow chart illustrating a second method of decoding a macroinstruction according to the present invention.

FIG. 8 is a flowchart illustrating the broad steps included in the expansion implementation of the present invention.

The method and apparatus of the present invention described above are particularly advantageous in that they provide a lower granularity of micro-instruction than prior art decoders, in response to the need for simpler and faster execution units. Specifically, the present invention facilitates the simplification of certain functional units by removing from these functional units the circuitry responsible for detecting and/or performing data manipulations required by the operand specification. These data manipulations are made the subject of "supplementary" micro-instructions, which are processed by appropriate functional units. The above described embodiment facilitates the architectural simplification of ALUs and AGUs. However, it will be appreciated that the teachings of the present invention can equally be applied to other functional units. Additionally, the decoder arrangements described above achieve this increased granularity of micro-instruction without requiring excessive increases in die space due to increased PLA area requirements. The two-step parallel or serial decoding of macroinstructions discussed above allows a large number of combinations and permutations of opcodes and operand specifications to be decoded, with increased granularity, in a space and time efficient manner.

Thus, a method and apparatus for decoding a macroinstruction, having an opcode and a specification of an operand have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of decoding a macroinstruction, the macroinstruction including an operational code (opcode) and a specification of an operand, the method comprising:

generating a first micro-instruction for execution by an execution unit of a processor, the first micro-instruction being generated responsive to an opcode of the macroinstruction; and generating a second micro-instruction for execution by an execution unit of the processor as a micro-instruction distinct and separate from the first micro-instruction, the second micro-instruction being generated responsive to only the specification of the operand of the macroinstruction, wherein the specification of the operand requires an operand data shifting operation or a memory address calculation operation prior to execution of the first micro-instruction generated responsive to the opcode of the macroinstruction.

2. The method of claim 1 including determining whether the specification of the operand in the macroinstruction requires the operand data shifting operation or memory address calculation operation prior to execution of the first micro-instruction.

3. The method claim 1 including discarding the second micro-instruction if it is determined that the specification of the operand within the macroinstruction does not require the operand data shifting operation or the memory address calculation operation.

4. The method claim 1 including only generating the second micro-instruction if it is determined that the specification of the operand requires the operand data shifting operation or the memory address calculation operation.

5. The method of claim 1 wherein the specification of the operand is included in the first micro-instruction, and the second micro-instruction is generated utilizing the second micro-instruction.

6. The method of claim 2 wherein the determining comprises determining whether the specification of the operand specifies an operand which is misaligned relative to a further operand specified in the macroinstruction.

7. The method of claim 6 wherein the determining comprises determining whether the operand is positioned at a high-byte location in a register, and whether the further operand is positioned at a low-byte location in a register.

8. The method of claim 7 wherein the generating of the second micro-instruction comprises generating the second micro-instruction to require shifting of the operand into alignment with the further operand.

9. The method of claim 2 wherein the determining comprises determining whether the specification of the operand specifies a memory operand.

10. The method of claim 9 wherein the generating of the second micro-instruction comprises generating the second micro-instruction to require adding at least two register values identified in the specification of the operand to calculate a memory address.

11. The method of claim 2 wherein the determining comprises determining whether the specification of the operand includes a scaled index.

12. The method of claim 11 wherein the generating of the second micro-instruction comprises generating the second micro-instruction to require calculation of the scaled index.

13. The method of claim 1 including ascertaining whether the opcode is of a type which may validly be paired with a specification of an operand requiring an operand data shifting operation or a memory address calculation operation.

14. The method claim 13 including only generating the second micro-instruction if it is ascertained that the opcode is of a type that may validly be paired with the specification of an operand requiring an operand data shifting operation or a memory address calculation.

15. A decoder arrangement for decoding a macroinstruction, the macroinstruction including an operational code (opcode) and a specification of an operand, the decoder arrangement comprising:
 a first decoder to generate a first micro-instruction for execution by an execution unit of a processor, the first micro-instruction being generated responsive to the opcode of macroinstruction; and
 a second decoder to generate a second micro-instruction for execution by an execution unit of the processor as a micro-instruction distinct and separate from the first micro-instruction, the second micro-instruction being generated by the second decoder responsive to only the specification of the operand of the macroinstruction, the specification of the operand necessitating an operand shifting operation or a memory address calculation operation prior to execution of the first micro-instruction generated responsive to the opcode of the macroinstruction.

16. The decoder arrangement of claim 15 including logic circuitry to determine whether the specification of the operand necessitates the operand data operation or the memory address calculation operation prior to execution of the first micro-instruction.

17. The decoder arrangement of claim 15 including a selector circuit, coupled to receive the first and second micro-instructions, that does not output the second micro-instruction if it is determined by the logic circuitry that the specification of the operand within the macroinstruction does not necessitate the operand data shifting operation or the memory address calculation operation.

18. The decoder arrangement of claim 15 wherein the logic circuitry is to determine whether the operand is misaligned relative to a further operand included in the macroinstruction.

19. The decoder arrangement of claim 18 wherein the logic circuitry is to determine whether the operand is positioned at a high-byte location in a register, and whether the further operand is positioned at a low-byte location in a register.

20. The decoder arrangement of claim 18 wherein the second decoder is to generate the second micro-instruction to specify shifting the operand into alignment with the further operand.

21. The decoder arrangement of claim 15 wherein the logic circuitry is to determine whether the operand is a memory operand.

22. The decoder arrangement of claim 21 wherein the logic circuitry is to determine whether the specification of the operand in the macroinstruction includes a two-register address.

23. The decoder arrangement of claim 22 wherein the first decoder is to generate the second micro-instruction to specify adding at least two register values identified in the specification of the operand to calculate a memory address.

24. The decoder arrangement of claim 21 wherein the logic circuitry is to determine whether the specification of the operand in the macroinstruction includes a scaled index.

25. The decoder arrangement of claim 24 wherein the second decoder is to generate the second micro-instruction to specify calculating the scaled index.

26. The decoder arrangement of claim 16 including logic circuitry to ascertain whether the opcode is of a type which may validly be paired with the specification of an operand that requires an operand data shifting operation or a memory address calculation operation.

27. A microprocessor comprising:
 an execution unit,
 a memory storing a plurality of macroinstructions, and;
 a decoder arrangement, coupled to the memory, to decode a macroinstruction received from the memory, the macroinstruction including an operational code (opcode) and a specification of an operand that necessitates an operand data shifting operation or a memory address calculation operation, the decoder arrangement comprising:
  (a) a first decoder to generate a first micro-instruction for execution by the execution unit of the microprocessor, the first micro-instruction being generated by the first decoder responsive to only the specification of the operand of the macroinstruction; and
  (b) a second decoder to generate a second micro-instruction for execution by the execution unit of the microprocessor as a micro-instruction distinct and separate from the first micro-instruction, the second micro-instruction being generated by the second decoder responsive to the opcode of macroinstruction;
 the execution unit being coupled to receive the first or second micro-instructions, and to execute the respective first or second micro-instruction,
 the first micro-instruction implementing the operand data shifting operation or the memory address calculation operation and being executable prior to execution of the second micro-instruction generated responsive to the opcode of the macroinstruction.

28. A method of decoding a macroinstruction, the macroinstruction including an opcode portion and an operand specifier portion, the method including:

utilizing the opcode portion of the macroinstruction to generate at least a first micro-instruction, specifying a first micro-operation, for execution within an execution unit of a processor; and utilizing only the operand specifier portion of the macroinstruction to generate at least a second micro-instruction, specifying a second micro-operation for execution within the execution unit of the processor as a micro-instruction distinct and separate from the first micro-instruction, the second micro-operation comprising either an operand data shifting operation or a memory address calculation operation to be performed prior to performance of the first micro-operation generated responsive to the opcode of the macroinstruction.

29. The method of claim 28 wherein the utilization of the operand specifier portion comprises determining whether the operand specifier portion requires an operand data shifting operation or a memory address calculation operation prior to performance of first micro-operation by an execution unit of a processor.

30. The method of claim 29 including discarding the second micro-instruction if it is determined that the operand specifier does not require an operand data shifting operation or a memory address calculation operation.

31. The method of claim 29 including bypassing the generation of the second micro-instruction if it is determined that the operand specifier portion does not require an operand data shifting operation or a memory address calculation operation.

32. A method of decoding a macroinstruction, the macroinstruction including an opcode portion and an operand specifier portion, for execution by a processor, the method including:

determining whether the operand specifier portion necessitates an operand data shifting operation or a memory address calculation operation prior to performance of a first micro-operation specified by a first micro-instruction generated utilizing the opcode portion of the macroinstruction; and if so, utilizing only the operand specifier portion of the macroinstruction to generate a second micro-instruction specifying an operand data shifting operation or a memory address calculator operation for performance by an execution unit of the processor, the second micro-instruction being for execution by the execution by the execution unit of the processor as a micro-instruction distinct and separate from the first micro-instruction.

33. The method of claim 32 including bypassing the generation of the second micro-instruction if it is determined that the operand specifier portion does not necessitate an operand data shifting operation or a memory address calculation operation.

34. A method of decoding a macroinstruction, the macroinstruction including an opcode portion and an operand specifier portion, for execution by a processor, the method including:

decoding the opcode portion of the macroinstruction to generate a first micro-instruction specifying a first micro-operation for performance within an execution unit of the processor; and decoding only the operand specifier portion of the macroinstruction to generate a second micro-instruction specifying a second micro-operation for performance within the execution unit of the processor, the second micro-operation potentially being required to perform an operand data shifting operation or a memory address calculation operation prior to performance of the first micro-operation and being for execution by the execution unit of the processor as a micro-instruction distinct and separate from the first micro-instruction;

determining whether the operand specifier portion necessitates an operand data shifting operation or a memory address calculation operation prior to performance of first micro-operation specified by a first micro-instruction;

if not, then discarding the second micro-instruction; and if so, then executing the second micro-instruction within the execution unit of the processor prior to execution of the first micro-instruction within the execution unit of the processor and as a micro-instruction distinct and separate from the first micro-instruction.

* * * * *